Jan. 27, 1925.
S. A. GIACOBBE
1,524,547
FILTER
Filed Dec. 23, 1922
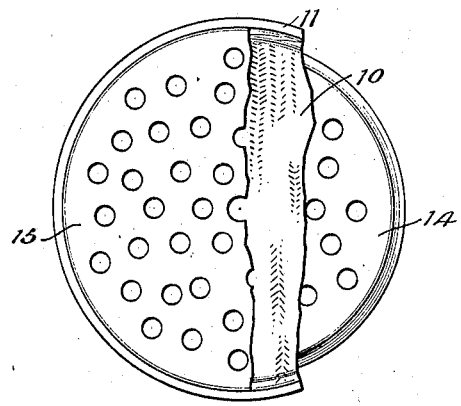
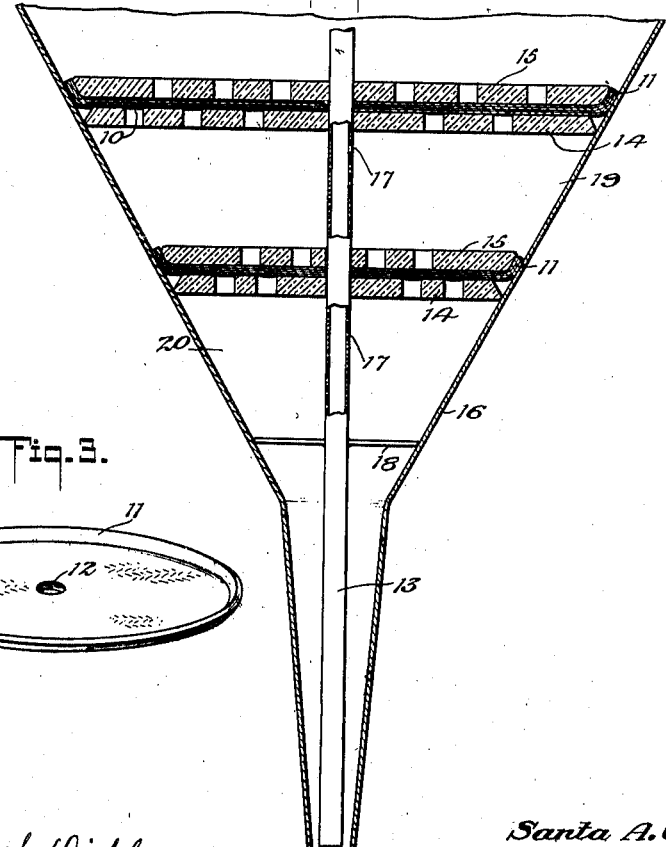
WITNESSES
Frederick Diehl
E. W. Savage
INVENTOR
Santa A. Giacobbe
BY
ATTORNEYS Patented Jan. 27, 1925.

1,524,547

UNITED STATES PATENT OFFICE.

SANTA A. GIACOBBE, OF NEW YORK, N. Y.

FILTER.

Application filed December 23, 1922. Serial No. 608,738.

*To all whom it may concern:*

Be it known that I, SANTA A. GIACOBBE, a citizen of the United States, and a resident of the city of New York, borough of Manhattan, in the county and State of New York, have invented new and useful Improvements in Filters, of which the following is a full, clear, and exact description.

This invention relates to filters primarily designed for use with funnels.

The general object of this invention is the provision of a cheap, simple and efficient filter for mounting in funnels or the like.

A further object of the invention is the provision of a filter including one or more filtering layers, for mounting in a funnel or the like, provided with means for allowing the escape of the air trapped in the funnel so as to facilitate the filtering process.

Another object of the invention is the provision of a filter having a plurality of filtering layers spaced from one another and providing in conjunction with the filtering layers means for conveying the air from the chambers between the filtering layers and from the chamber formed below the bottom filtering layer.

Still another object of the invention is the provision of a filter including a plurality of filtering layers for mounting in a funnel, the filtering layers being adapted for shaping so as to form an annular member which lies parallel to the funnel wall.

These objects are accomplished by providing a perforated tube, and a plurality of filtering layers for mounting in spaced relation to one another on the perforated tube, said layers being constructed with flexible edges so that when the filter is placed in a funnel the edges of the filtering layers bend upward forming annular members which lie parallel to the wall of the funnel.

These and other objects of the invention will be more clearly understood from the following detailed description and accompanying drawings.

Figure 1 is a top plan view of a filtering layer with a portion broken away to show its component parts;

Figure 2 is a vertical section through the filter showing it positioned in a funnel;

Figure 3 is a perspective view of the filtering layer without its supporting members.

Referring to the above-mentioned drawings, a disk of filter mass 10 is shown provided with an upturned edge 11. The disk 10 is not necessarily formed with the upturned edge 11 rigidly in position, but the disk is flexible and the edges may be turned upward to conform to any desired shape. When used with a funnel such upturned edges lie along the funnel wall and thus give better contact with the wall than a disk cut the size of a section of the funnel in which it is to be seated. In the case of a disk cut the size of a section of the funnel, should there be any irregularities in the funnel structure, a channel between the funnel wall and the disk might result. This would result in a portion of the substance it is desired to filter out of the solution passing through the channel. With a filter of this construction the upturned edges of the filter disk lie along the wall of the funnel and fit into any irregular shaped portions of the funnel wall. This filter is for use with a funnel provided with an air tube and so the disk 10 is provided with an opening 12 in the center which fits tightly over the air tube 13 shown in Figure 2.

In using the filter disk 10 with a funnel 16, two perforated plates 14 and 15 would be provided in conjunction with the disk. The plate 14 serves to support the filter disk 10 in a horizontal plane, allowing the upturned edges 11 to lie along the wall of the funnel 16. The perforated plate 15 rests on the filter disk 10, forcing it into engagement with the perforated plate 14 and pressing the upturned edges tightly against the wall of the funnel.

The tube 13 used in conjunction with the filter disks 11 is provided with a plurality of perforations 17 and prongs 18 for supporting it in a funnel or the like. In assembling the filter, the filter disks 11 are mounted on the tube 13 and spaced from one another. The perforations 17 are so located that when the filter disks 11 are properly spaced from one another perforations occur between the filter disks and below the bottom filter disk. If only one filter disk is mounted on the tube then it would be necessary to locate all the perforations 17 below said filter disk. When the filter is positioned in a funnel, as shown in Figure 2, a chamber 19 is formed between the filter disks 11 and a chamber 20 is formed below the bottom filter disk. The perforations 17 establish communication between the chambers and the tube 13.

In using a filter of this type, when the solution to be filtered is poured onto the upper filter disk, a certain amount of air is trapped in the chambers 19 and 20. This air trapped in the chambers 19 and 20 would normally decrease the efficiency of the filter. However, in a filter of this type the air escapes through the perforations 17 and the tube 13 and thus allows the liquid from the solution to flow freely.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A filter of the character described for use with funnels, comprising a plurality of filtering layers mounted in the funnel in spaced relation to one another forming chambers between said filtering layers, and a tube extending through said filtering layers, the portions of the tube located between the filtering layers and below the bottom filtering layer being perforated.

2. A filter of the character described, comprising a tube, filtering layers mounted on said tube and spaced from one another, the portions of said tube located between the filtering layers and below the lowest filtering layer being perforated, and means for supporting the tube in position in the filtering layers.

3. In a filter of the character described including a plurality of filtering layers spaced from one another, a perforated tube for mounting in the filtering layers to locate perforations between each filtering layer and below the bottom filtering layer.

4. As a new article of manufacture, a filter of the class described for use with funnels comprising a plurality of filtering layers having openings extending through their centers and provided with flexible edges to fold upward along the wall of the funnel, a perforated air tube for mounting in the openings through the centers of the filtering layers locating perforations between each pair of layers and below the bottom layer, and means for supporting the tube in position.

5. A filter for use with funnels, comprising a filtering layer for mounting in said funnel, a perforated tube for mounting in said filtering layer, locating the perforations below the filtering layer, and means for supporting the tube in position in the filtering layer.

6. In a filter of the character described including an air tube, a filter layer comprising a disk of filter mass having an opening in its center for receiving the air tube, flexible edges capable of being bent to any desired shape, and rigid members for mounting on the disk to support it.

7. A filter of the character described, comprising a perforated tube, a plurality of filtering layers each including a disk of filtering material having flexible edges capable of being bent to any shape, and rigid supporting members mounted in spaced relation on said perforated tube so that perforations are located between the layers and below the bottom layer, and means provided on the tube for supporting it in a container.

SANTA A. GIACOBBE.